Figure 1:
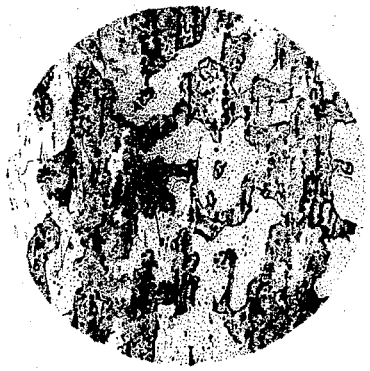

May 10, 1938.  E. A. HARTY  2,117,164
METHOD OF MANUFACTURING CONTACT RECTIFIERS
Filed Feb. 21, 1935  3 Sheets-Sheet 2
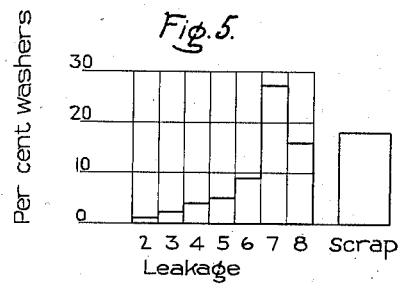
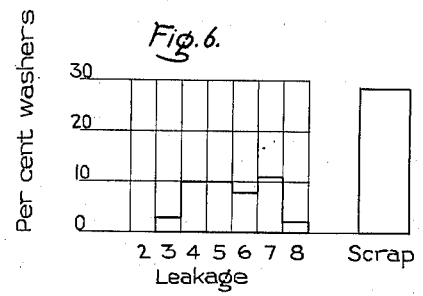
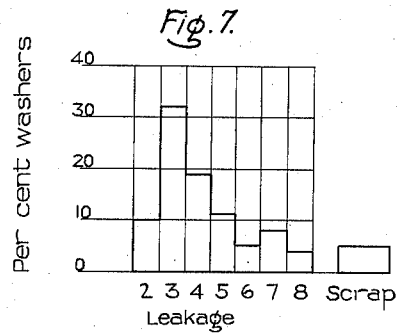
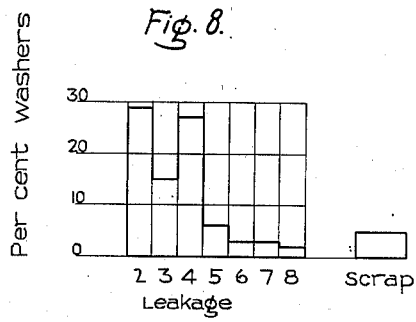
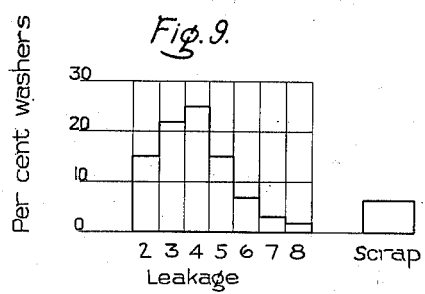
Inventor:
Edgar A. Harty,
by Harry E. Dunham
His Attorney.

May 10, 1938.  E. A. HARTY  2,117,164
METHOD OF MANUFACTURING CONTACT RECTIFIERS
Filed Feb. 21, 1935    3 Sheets-Sheet 3

Inventor:
Edgar A. Harty,
by Harry E. Dunham
His Attorney.

Patented May 10, 1938

2,117,164

UNITED STATES PATENT OFFICE 2,117,164

METHOD OF MANUFACTURING CONTACT RECTIFIERS

Edgar A. Harty, Marblehead, Mass., assignor to General Electric Company, a corporation of New York Application February 21, 1935, Serial No. 7,636

8 Claims. (Cl. 29—155.55)

My invention relates to the manufacture of rectifiers of the contact type wherein a film is formed on a metal blank to form the rectifier element as in the copper oxide rectifier, and particularly to methods of preparing metal sheet or plate for the manufacture of contact rectifier elements.

It has for one of its objects to provide a method whereby the chemical and mechanical characteristics of the metal surfaces on which the film is to be formed are definitely controlled.

In the preparation of metal sheet for use in the manufacture of copper oxide rectifier elements the material should be almost entirely metallic copper, the rest being constituted by a small proportion of oxygen with some traces of arsenic, etc., any proportion of oxygen above 0.05% being detrimental when the material is used for rectifier elements and the absence of oxygen also being detrimental. Inasmuch as the film of oxide formed on the copper blanks to constitute a finished element is very thin, it follows that in the manufacture of the elements from the copper sheet, only the chemical and mechanical characteristics of the surface of the sheet copper are of particular interest. This surface on which the film is to be formed must be of the required chemical composition and with no impurities, must have no scratches, pits, or rough spots, and must be cold rolled or smoothed in a manner suitable for polishing.

Heretofore the process of preparing rectifier element blanks, for the formation of the film on copper oxide elements for example, has comprised hot rolling the copper plate or sheet to reduce the thickness and pickling the material previous to giving it a pass in the mill rolls, stopping the hot rolling toward the end of the operation of reducing the thickness to the desired size, pickling the material again, subjecting the plate to a cold rolling operation to reduce it to the desired thickness, the sheet being, for example, rolled hot to approximately 0.053 inch in thickness and then reduced to 0.050 inch by the cold rolling, then punching the material into rectifier blanks or washers, and removing foreign material from the surface by chemical etching and cleaning or by sanding, or rubbing the surface with emery paper.

Difficulties have, however, been encountered in the manufacture of rectifier elements from material treated in accordance with the above-described and similar methods. Sanding the surface of the copper or rubbing with emery paper produces scratches which are undesirable and a source of trouble in the process of oxidizing the surface to produce the film. The pickling, or etching with acid, tends at times to cause the copper surface to approach the condition of deoxidized copper, the copper in this latter condition being unsuitable to produce the oxide film on its surface due to the lack of bond between the oxide and the metal, the oxide film appearing to peel off very readily. The etching depends on the skill of the operators and also on the degree of concentration of the acid and, therefore, the etching process causes considerable variation to occur in the condition of the surface of the blanks. The copper sheet is subject to considerable variation in the condition of the surface due to contamination while being handled at the mill. Generally scale and dirt are pressed into the surface and these undesirable foreign materials are then removed by the etching process, leaving small depressions or hollowed areas on the surface of the material. These depressions or hollowed areas of the plate surface cannot be oxidized satisfactorily, and such areas represent a contributing cause for the breakdown of the rectifier disc or washer when used in a copper oxide rectifier stack assembly.

In accordance with my invention these and other difficulties encountered heretofore in preparing metal sheet such as copper for the manufacture of rectifier elements are overcome by subjecting the surface of sheets of suitable thickness to a grinding operation whereby the removal of material from the surface is effected to such an extent and in such manner that the chemical and mechanical characteristics of the surface are definitely controlled. A high degree of uniformity in the finished product is attained. Furthermore, rectifier element material having unsuitable surface characteristics as hereinabove set forth is made usable without increasing the proportion of rectifier elements rejected in the finished product, thereby effecting a considerable economy in cost of material.

My invention will be better understood from the following description when read in connection with the accompanying drawings and its scope will be pointed out in the appended claims.

Figure 15:
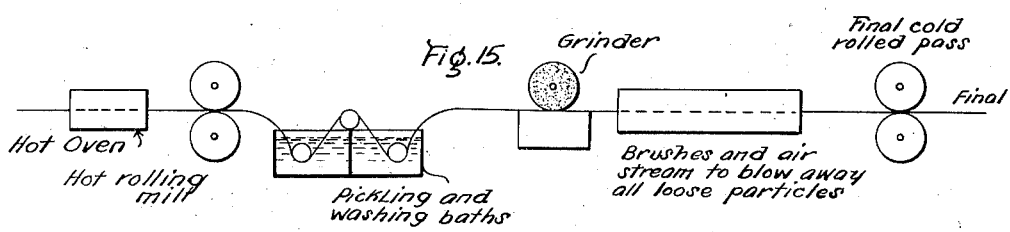

Referring to the drawings, Figs. 1 to 4 are photomicrographic views illustrating surface conditions in copper plate for use in copper oxide rectifier elements, Figs. 5 to 9 are leakage curves of copper oxide rectifier elements made from copper plate having various surface characteristics, Figs. 10 to 14 are leakage curves of further copper oxide rectifier elements, and Fig. 15 illustrates various steps in the method of manufacturing contact rectifier elements.

Figure 3:
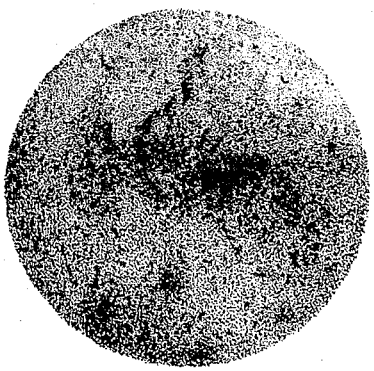
Figure 2:
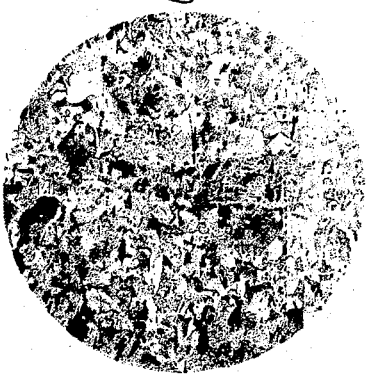
Figure 4:
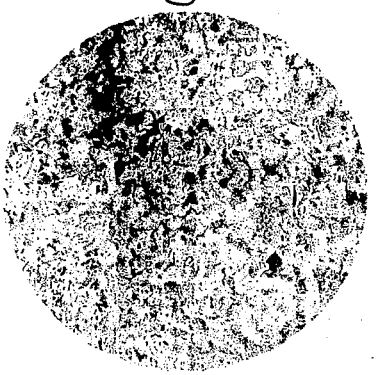

In Fig. 1 is shown a 10 diameter view of a piece of copper of suitable chemical composition for use in the manufacture of copper oxide elements but having surface impurities which have been rolled into the surface. Fig. 2 is a 100 diameter view of the same piece of copper as in Fig. 1 but after the surface has been ground off 0.005 inch to 0.010 inch. Fig. 3 is a 10 diameter view of a reference piece of copper taken from stock which is not only of suitable chemical composition for use in rectifier elements but also has no impurities or imperfections in its surface. Fig. 4 is a 100 diameter view of the above-described reference piece shown in Fig. 3, after the surface of the reference piece has been ground off in the same manner that the imperfect piece shown in Fig. 1 is ground to form the surface shown in Fig. 2.

It will be observed that before the grinding operations the surfaces of the imperfect piece (shown in Fig. 1) and of the reference piece (shown in Fig. 3) are very different in appearance, the imperfect piece showing strongly marked irregular areas indicating the presence of surface irregularities and impurities, whereas the surface of the reference piece shows no such irregular areas. After grinding, however, it is evident from Figs. 2 and 4 that even under the relatively high magnification of 100 diameters, the piece shown in Fig. 1 as having a surface unsuitable for forming the oxide film thereon, and the reference piece of suitable copper shown in Fig. 3, have surfaces substantially identical in appearance. The grinding off of a surface layer of a predetermined depth from the reference piece merely exposed, as shown in Fig. 4, another surface free, like the surface shown in Fig. 3, from impurities. But the grinding off of a layer of the predetermined depth from the imperfect piece results in the positive elimination of the foreign material, depressed areas, deoxidized portions, or other surface defects. In place of the surface shown in Fig. 1 as unsuitable for rectifier manufacture, the grinding process provides a copper surface which is shown in Fig. 2 under high magnification to be free of surface defects and to be suitable equally with the reference piece, shown in Fig. 4 under high magnification, for the manufacture of copper oxide rectifier elements.

The preferred process of preparing copper sheet material for use in copper oxide rectifiers in accordance with my invention is as follows:

The cakes of copper, which have a low oxygen content, of the order of 0.03% or from 0.025% to 0.035%, are hot rolled. Between passes of the copper through the rolls the copper is pickled in the usual manner as by dipping the sheet into an acid solution which may be fifty parts nitric acid and fifty parts sulphuric acid. The material is treated in the above-described manner until the thickness of the sheet has been reduced to such a degree that the sheet is approximately 10% thicker than the finished size which is specified.

In accordance with my present invention the copper sheet is then ground, preferably on one side only, to a sufficient depth, for example from 0.005 inch to 0.010 inch, to eliminate all surface impurities or other defects which the pickling did not remove and also to a sufficient depth to eliminate from the sheet surface any material forced into the surface by the rolls.

After this grinding operation the sheet, which must be free from powdered copper produced by the grinding operation, is cold rolled between polished rolls to smooth this ground surface and to eliminate therefrom fine scratches which may have been produced by the grinding operation. The resultant sheet of copper has a mirror-like surface. This material is then used in punching the rectifier washers or discs, great care being taken to prevent scratching the surface. No additional treatment of the washers or discs is required and the washers can be oxidized, in the usual manner to form the required copper oxide film, just as received from the punch press. However, if desired, after the washers are punched from the sheet, the washers may be given a cleaning or bright dip to eliminate any film of oil or dirt which the washers may possibly have acquired during or after the blanking operation in the punch press. In the bright dip operation, if employed, the rectifier blanks may be dipped into a weak acid solution, or any solution or liquid, gasoline for example, which will remove a grease film and at the same time not stain the surface of the blank may be used.

The advantageous results I have obtained, in accordance with my invention, in preparing copper sheet stock for the formation of a film on a surface of rectifier element blanks will be understood more clearly by reference to the curves shown in Figs. 5 to 14.

Referring first to the curves shown in Figs. 5 to 9, each of these curves represents the result of leakage current tests conducted on various lots of copper-oxide rectifier washers or discs. The leakage current in each lot was measured in milliamperes, a potential of 6 volts D. C. being applied to the discs in the direction in which they block current flow. In each curve is shown, for a given lot of washers, the percentage of washers showing leakages from the relatively low leakage of 2 milliamperes at 6 volts up to a leakage of 8 milliamperes. At the right of each leakage curve is shown graphically the percentage of scrap, or washers rejected, for the given lot.

The curves of Figs. 5 and 6 represent the result of the above-described leakage test applied to two lots of rectifier washers made from copper sheet having surfaces showing defects, such as illustrated in Fig. 1 for example. It will be noted from Figs. 5 and 6 that these lots are characterized by high percentages of washers showing leakages toward the high end of the curves, and that the scrap is high.

The curve of Fig. 7 shows the results of leakage tests applied to rectifier washers made from copper sheet having, as shown in Fig. 3, for example, no imperfections or impurities in its surface.

Comparing the leakage curve of the lot shown in Fig. 7 with the leakage curves of the lots shown in Figs. 5 and 6, it will be evident that whereas the lots of Figs. 5 and 6 indicate high percentages of washers having leakage above 5 milliamperes, the Fig. 7 lot indicates relatively low percentages of washers having this amount of leakage. In Fig. 7 the percentages at the low end of the curve tend definitely to predominate, the majority of the washers showing a leakage of only 5 milliamperes or less.

Referring now to the leakage curve shown in Fig. 8, this curve shows the result of the above-described leakage test on a lot of washers made for commercial use from copper sheet which had surface defects, such as characterized the lots referred to in connection with the curves of Figs. 5 and 6, but which, before the punching of the washers, was subjected to the surface grinding process in accordance with my invention and as hereinbefore set forth in connection with Figs. 1 to 4. Comparing the curve of Fig. 8 with the curves of Figs. 5 and 6 showing the leakage for the lots made from copper sheet having defective surfaces not subjected to the grinding process, it will be seen that in the lot whose leakage is illustrated in Fig. 8 the majority of the washers show leakage of only 5 milliamperes or less, the percentages at the low end of the curve tending to predominate similarly to the percentages shown in the curve of Fig. 7 illustrating leakage in washers made from copper sheet having no surface defects.

Fig. 9 shows leakage curves of washers made for commercial use from other copper sheet having, like that of Fig. 7, no surface defects. Comparing Fig. 8 with Fig. 9, the leakage curve of Fig. 8, for washers made from copper sheet having a defective surface which has been removed by the grinding process in accordance with the invention, is seen to indicate as high a percentage of washers having low leakage as is indicated in the leakage curve of Fig. 9.

Figure 10:
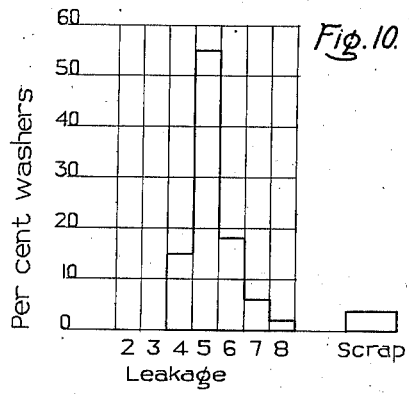
Figure 11:
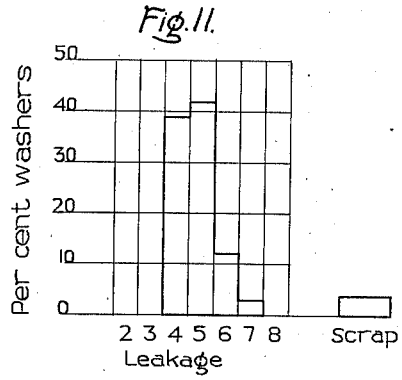
Figure 12:
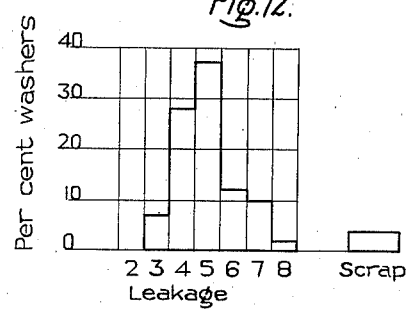
Figure 13:
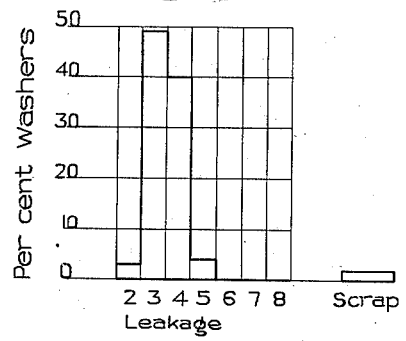
Figure 14:
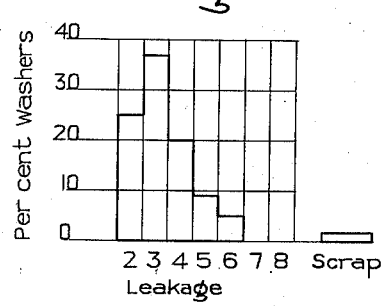

In Figs. 10 to 12 are shown further leakage curves of rectifier washers punched from copper sheets which had surface defects in varying degree but which were not subjected to the above-described surface grinding process. Fig. 13 shows the leakage curve of a lot of rectifier washers from sheets which were the same as those of Figs. 10 to 12 except that in the case of Fig. 13 the sheets were subjected to the grinding process for the removal of the surface defects. Fig. 14 shows the leakage curve of a lot of rectifier washers punched from sheets, similar to those of Fig. 9, having no surface defects.

Comparing Fig. 13 with Figs. 10 to 12 and with Fig. 14: Fig. 13, illustrating the leakage curve of washers made from sheets having surfaces ground for the removal of defects, indicates a product as uniform as, or even more uniform than that indicated by Fig. 14, and of similar low leakage, or of lower leakage. The curve of Fig. 13, therefore, indicates in the same manner as the curve of Fig. 8 that, by reason of the grinding process whereby the surface of the copper sheet is definitely controlled, a uniform, low leakage product is obtained even from sheets, such as referred to for example in connection with Figs. 10 to 12, which have surfaces more or less defective, and which, in the absence of the described grinding process, would produce rectifier elements of relatively high average leakage, and with considerable scrap.

In general the leakage curves of Figs. 5 to 14 indicate that, by subjecting the metal sheet to the grinding process in accordance with my invention whereby a surface layer is removed of sufficient depth to expose invariably a metal surface suitable for rolling to a mirror finish and free from surface defects, the surfaces of the sheets are definitely controlled. A uniform product having a consistently low leakage characteristic as illustrated particularly in Fig. 13 is insured, thereby permitting the lowering, if desired, of the required leakage limit and improving the efficiency of the product; and in addition metal sheet otherwise unsuitable for rectifier use is made available thereby reducing the cost of manufacture.

My invention has been described herein by reference to certain particulars thereof for purposes of illustration. It is to be understood, however, that the invention is susceptible of various changes and modifications and that by the appended claims I intend to cover any such modifications as fall within the true spirit and scope of my invention.

What I claim as new and desire to secure by Letters Patent of the United States, is:—

1. The method of manufacturing rectifier elements from a metal plate the surface of which has foreign material rolled thereinto tending to prevent the formation of a compound of a metal on said surface, which includes rolling said plate to reduce the thickness thereof by a predetermined amount, pickling said plate, griding said surface to a depth sufficient to remove from said plate a layer of substantial thickness exposing a smooth and continuous metal surface thereby to remove all of said foreign material remaining after said pickling and to expose a clean surface of said metal for said formation of the compound, and rolling said plate to smooth said surface.

2. The method of manufacturing copper oxide rectifier elements from a copper plate a surface of which has foreign material rolled thereinto tending to impair the formation of the oxide film on said surface, which includes rolling said plate to reduce the thickness thereof, pickling said plate between passes, grinding said surface to a depth sufficient to remove a layer of said plate sufficiently thick to remove all of said foreign material remaining after said pickling and to expose a smooth and continuous copper surface, and cold rolling said plate sufficiently to produce a mirror-like surface thereon.

3. The method of manufacturing copper oxide rectifier elements from a copper plate having foreign material in the surface layer thereof which includes rolling said copper plate to a thickness greater by a predetermined amount than the thickness of the finished elements, pickling said plate, grinding said surface of said plate to a depth sufficient to remove a layer of said plate of such thickness as to remove all of said foreign material remaining after said pickling and to expose a smooth and continuous copper surface, and rolling said plate sufficiently to eliminate therefrom fine scratches produced by said grinding.

4. The method of manufacturing copper oxide rectifier elements from a copper plate which includes rolling said plate to reduce the thickness thereof and pickling said plate between passes, grinding a surface of said plate to a depth sufficient to remove a layer of said plate of such thickness as to expose a smooth and continuous copper surface, thereby to eliminate imperfections remaining in said surface after said rolling and pickling, and rolling said plate to smooth said surface.

5. In the manufacture of copper oxide rectifier elements from a sheet of copper, the method of controlling the chemical content of the surface of said sheet on which the copper oxide film is to be formed, which includes grinding said surface to a sufficient depth to remove a layer of said sheet of such thickness as to expose a smooth and continuous copper surface, thereby to remove imperfections and foreign material from said surface and to provide a uniformly flat and clean copper surface for the formation of said film.

6. The method of manufacturing copper oxide rectifier elements which includes hot rolling copper plate having an oxygen content of the order of .030% and pickling said plate between passes, said hot rolling and pickling being continued until the thickness of said plate is approximately 10% greater than the predetermined finished thickness of said elements, grinding a surface of said plate to a depth sufficient to remove a layer of said sheet of such thickness as to expose a smooth and continuous copper surface, thereby to eliminate surface impurities not removed by said pickling and to eliminate depressions in said surface due to said pickling and to remove material forced into said surface by said rolling, and cold rolling said plate between polished rolls to smooth said surface and to eliminate scratches therefrom produced by said grinding.

7. The method of manufacturing copper oxide rectifier elements which includes rolling said plate to reduce the thickness thereof and pickling said plate between passes, grinding a surface of said plate to a depth sufficient to remove a layer of said plate of such thickness as to expose a smooth and continuous copper surface, thereby to eliminate imperfections remaining in said surface after said rolling and pickling, rolling said plate to smooth said surface, punching rectifier element blanks from said plate, and dipping said blanks in cleaning fluid to remove foreign material deposited on said ground surface during the punching operation.

8. The method of manufacturing copper oxide rectifier elements which includes passing copper plate having an oxygen content of the order of .030% between hot rolls and pickling said plate between passes through the rolls until the thickness of said plate is approximately 10% greater than the predetermined finished thickness of said elements, grinding a surface of said plate to a sufficient depth to remove a layer of said plate of such thickness as to expose a smooth and continuous copper surface, thereby to eliminate surface impurities not removed by said pickling, and to eliminate depressions in said plate due to the removal of surface impurities therefrom during said pickling and to remove material forced into said surface by said rolls, cold rolling said plate between polished rolls to smooth said surface and to eliminate scratches therefrom produced by said grinding, punching rectifier element blanks from said plate, and dipping said blanks in cleaning liquid to remove from said ground surface material deposited thereon during the punching operation.

EDGAR A. HARTY.